United States Patent
Vemulapalli et al.

(10) Patent No.: US 12,020,512 B2
(45) Date of Patent: Jun. 25, 2024

(54) SPOOF DETECTION USING EYE BOUNDARY ANALYSIS

(71) Applicant: Jumio Corporation, Palo Alto, CA (US)

(72) Inventors: Spandana Vemulapalli, Kansas City, MO (US); David Hirvonen, Brooklyn, NY (US)

(73) Assignee: Jumio Corporation, Sunnyvale, CA (US)

( * ) Notice: Subject to any disclaimer, the term of this patent is extended or adjusted under 35 U.S.C. 154(b) by 342 days.

(21) Appl. No.: 17/478,417

(22) Filed: Sep. 17, 2021

(65) Prior Publication Data

US 2023/0091381 A1 Mar. 23, 2023

(51) Int. Cl.
| | |
|---|---|
| G06K 9/00 | (2022.01) |
| G06F 21/32 | (2013.01) |
| G06N 20/00 | (2019.01) |
| G06T 7/38 | (2017.01) |
| G06V 10/56 | (2022.01) |
| G06V 10/60 | (2022.01) |

(Continued)

(52) U.S. Cl.
CPC .............. G06V 40/45 (2022.01); G06F 21/32 (2013.01); G06N 20/00 (2019.01); G06T 7/38 (2017.01); G06V 10/56 (2022.01); G06V 10/60 (2022.01); G06V 40/193 (2022.01)

(58) Field of Classification Search
CPC ........ G06V 40/45; G06V 10/56; G06V 10/60; G06V 40/193; G06F 21/32; G06N 20/00; G06T 7/38
See application file for complete search history.

(56) References Cited

U.S. PATENT DOCUMENTS

| | | | |
|---|---|---|---|
| 10,121,059 B2 * | 11/2018 | Yoo ........................ | G06F 21/32 |
| 10,691,939 B2 * | 6/2020 | Xue ....................... | H04N 23/611 |

(Continued)

FOREIGN PATENT DOCUMENTS

| | | | | |
|---|---|---|---|---|
| AU | 2018247216 B2 * | 11/2019 | ......... | G06K 9/00221 |
| BR | 112017004427 B1 * | 1/2021 | ......... | G06K 9/00221 |

(Continued)

OTHER PUBLICATIONS

Liveness Detection for Embedded Face Recognition System, Hyung-Keun Jee et al., IJOBMS, 2006, pp. 1-4 (Year: 2006).*

(Continued)

*Primary Examiner* — Jayesh A Patel
(74) *Attorney, Agent, or Firm* — Patent Law Works LLP

(57) ABSTRACT

Methods, systems, and computer-readable storage media for determining that a subject is a live person using a color-coded sequence including a sequence of colors. A subject is illuminated in accordance with the sequence of colors. A sequence of images of the subject is captured, where the sequence of images are temporally synchronized with illumination by the color-coded sequence. A filtered response image is generated, by a matched filtering process on the sequence of images using the selected color-coded sequence. A determination is made, based on structural features around an eye region of the filtered response image, that the subject is a live person. Responsive to determining that the subject is a live person, initiating an authentication process to authenticate the subject.

17 Claims, 9 Drawing Sheets

(51) Int. Cl.
*G06V 40/18* (2022.01)
*G06V 40/40* (2022.01)

(56) References Cited

U.S. PATENT DOCUMENTS

| | | | | |
|---|---|---|---|---|
| 11,023,757 | B2* | 6/2021 | Park | G06V 40/45 |
| 11,030,470 | B2* | 6/2021 | Han | H04N 5/33 |
| 11,126,879 | B1* | 9/2021 | Vemulapalli | G06V 40/173 |
| 11,195,009 | B1* | 12/2021 | Joshi | G06V 10/143 |
| 11,341,880 | B1* | 5/2022 | Derakhshani | G01J 1/0228 |
| 2016/0071275 | A1* | 3/2016 | Hirvonen | H04N 23/63 382/103 |
| 2019/0130168 | A1* | 5/2019 | Khitrov | G06N 3/045 |
| 2019/0303645 | A1* | 10/2019 | Ting | G06V 40/193 |
| 2020/0134345 | A1* | 4/2020 | Joshi | G06V 40/45 |
| 2020/0134645 | A1 | 4/2020 | Kaneichi | |
| 2020/0175256 | A1* | 6/2020 | Benini | G06V 40/45 |
| 2020/0312007 | A1* | 10/2020 | Liu | G06T 15/04 |
| 2021/0110185 | A1* | 4/2021 | Rowe | G06V 40/45 |
| 2021/0357671 | A1* | 11/2021 | Joshi | G06V 40/45 |
| 2022/0262163 | A1* | 8/2022 | Wang | G06V 40/197 |
| 2022/0343680 | A1* | 10/2022 | Wang | G06V 40/45 |

FOREIGN PATENT DOCUMENTS

| | | | | |
|---|---|---|---|---|
| EP | 3995989 A1 * | 5/2022 | | G06K 9/00201 |
| JP | 2018032391 A * | 3/2018 | | G06F 21/32 |
| JP | 2018524072 A | 8/2018 | | |
| WO | WO2014043003 A1 * | 3/2014 | | |
| WO | WO-2016010724 A1 * | 1/2016 | | G06K 9/00597 |
| WO | WO-2016040487 A2 * | 3/2016 | | G06K 9/00221 |
| WO | 2018072028 A1 | 4/2018 | | |
| WO | WO-2018118120 A1 * | 6/2018 | | G06K 9/00228 |
| WO | WO-2020086991 A1 * | 4/2020 | | G06F 21/32 |
| WO | WO-2021015293 A1 * | 1/2021 | | G06K 9/00255 |

OTHER PUBLICATIONS

Video-Based Face Spoofing Detection through Visual Rhythm Analysis, Allan da Silva Pinto et al., SIBGRAPH, 2012, pp. 221-228 (Year: 2012).*

Vaas, sophos.com [online], "Google files patent to let you unlock your phone by grimacing at it," Jun. 12, 2013, retrieved on Oct. 18, 2021, retrieved from URL<https://nakedsecurity.sophos.com/2013/06/12/google-files-patent-to-let-you-unlock-your-phone-by-grimacing-at-it/>, 11 pages.

PCT International Search Report and Written Opinion; Application No. PCT/US2022/043615 Jumio Corporation, International filing date of Sep. 15, 2022, dated Jan. 24, 2023, 13 pages.

* cited by examiner

SPOOF DETECTION USING EYE BOUNDARY ANALYSIS

TECHNICAL FIELD

This specification generally relates to security control using image capture devices.

BACKGROUND

Malicious actors have been known to attempt to breach the security of face recognition systems by using masks representing the face of an actual user. Such spoof representations may be referred to as presentation attack instruments, and can include, for example, images presented on a display device or printed as a photograph, or a mask.

SUMMARY

In one aspect, this document describes a method for controlling access to a secure system based on determining that a subject is a live person. The secure system is a system to which access is controlled, e.g. by using authentication and/or authorization of one or more users trying to access the system. The method includes obtaining a color-coded sequence may include a sequence of colors. A subject is illuminated in accordance with the sequence of colors. A sequence of images of the subject is captured, where the sequence of images are temporally synchronized with illumination by the color-coded sequence. A filtered response image is generated, by a matched filtering process on the sequence of images using the selected color-coded sequence. A determination is made, based on structural features around an eye region of the filtered response image, that the subject is a live person. Responsive to determining that the subject is a live person, initiating an authentication process to authenticate the subject.

In another aspect, this document describes a system for controlling access to a secure system based on determining that a subject is a live person. The system includes one or more computers; and one or more computer memory devices interoperably coupled with the one or more computers and having tangible, non-transitory, machine-readable media storing one or more instructions that, when executed by the one or more computers, perform various operations. The operations include obtaining a color-coded sequence may include a sequence of colors. A subject is illuminated in accordance with the sequence of colors. A sequence of images of the subject is captured, where the sequence of images are temporally synchronized with illumination by the color-coded sequence. A filtered response image is generated, by a matched filtering process on the sequence of images using the selected color-coded sequence. A determination is made, based on structural features around an eye region of the filtered response image, that the subject is a live person. Responsive to determining that the subject is a live person, initiating an authentication process to authenticate the subject.

In another aspect, this document describes one or more non-transitory computer-readable storage devices coupled to one or more processors and having instructions stored thereon which, when executed by the one or more processors, cause the one or more processors to perform various operations. The operations include obtaining a color-coded sequence may include a sequence of colors. A subject is illuminated in accordance with the sequence of colors. A sequence of images of the subject is captured, where the sequence of images are temporally synchronized with illumination by the color-coded sequence. A filtered response image is generated, by a matched filtering process on the sequence of images using the selected color-coded sequence. A determination is made, based on structural features around an eye region of the filtered response image, that the subject is a live person. Responsive to determining that the subject is a live person, initiating an authentication process to authenticate the subject.

Implementations of the above aspects can include one or more of the following features. Determining that the subject is the live person can include determining whether the eye region of the filtered response image can include a portion of a mask with eye cutouts. The structural features of the subject around the eye region can include one or more of depth discontinuities and albedo variations. Determining, based on the filtered response image, that the subject is a live person can include processing the filtered response image using a machine learning process trained to discriminate between filtered response images of live persons and filtered response images of alternative representations of live persons. Generating the filtered response image can include: generating, from the sequence of images, a sequence of spatially aligned images, calculating a sequence of filtered response images by applying a matched filter to the sequence of spatially aligned images, where the matched filter corresponds to the selected color-coded sequence, and selecting the filtered response image from the sequence of filtered response images. The operations can include: determining, based on the filtered response image, a measured signal strength, determining a difference between a predicted signal strength and the measured signal strength, and determining, based on the structural features of the subject around the eye region that the subject is a live person. The operations can include: determining, based on the structural features of the subject around the eye region, an absence of eye cutout features, and in response to determining the absence of the eye cutout features, determining that the subject is the live person.

Particular implementations of the subject matter described in this disclosure can be implemented so as to realize one or more of the following advantages. Spoof detection systems that rely on eye-specific cues like corneal reflection or eye movement cues may be breached by masks that have eye cutouts. The technology described herein addresses this vulnerability by using active illumination signals to enhance the depth discontinuities and differences in albedo between inner eye hole tissues (often from a live user) and outer eye material (from a spoof presentation such as a mask or photo). Specifically, a unique temporal color-coded sequence with optimized auto-correlation properties is presented on the screen, while a corresponding sequence of synchronized illuminated face images is captured by the camera. Matched temporal filters are applied to the captured stabilized image sequence to create a filtered response image that reveals depth discontinuities and differences in albedo between inner eye hole tissues (often from a live user) and outer eye material (from a spoof presentation such as a mask or photo). The filtered response image can reveal inner vs outer eye hole appearances, which in turn can be used as a discriminator in detecting whether the subject is wearing a 3D or a 2D spoofing mask with eye cutouts.

Implementations of the present disclosure can be used, for example, in a camera-based liveness classification process. The implementations of the present disclosure can use a temporal color-coded sequence in screen illumination and can use matched filters to analyze reflectance properties of a subject in the scene for the purpose of liveness classification of the subject. In particular, an authentication server can generate a set of color-coded sequences and can randomly select a color-coded sequence from the set at runtime. The selection process can reduce the probability that an attacker is able to mimic the same sequence as the sequence selected by the authentication server. Using the technology described herein, the authentication server can determine that the subject is an alternative representation of a live person, and can prevent the attacker from accessing a secure system by blocking one or more functions associated with accessing the secure system, such as interrupting a communication with the secure system. In some implementations, one or more of the steps above can be performed by an authentication client running on a client device, e.g., a mobile device of a user.

The implementations of the present disclosure can therefore facilitate implementation of spoof detection based on active illumination techniques using the available user device, without the need for an additional device. The image acquisition device can be a camera installed on a mobile device, or a camera installed on a kiosk device, etc. The illumination device can be the display screen of a mobile device or a kiosk device, or an illumination source of a kiosk device. This spoof detection system can be implemented on resource-constrained environments such as mobile devices, reducing hardware complexities associated with other devices that use more complex biometric authentication systems. The implementations of the present disclosure does not require previous acquisition and storage of user images or videos on a database, because the method can perform liveness detection based on images captured at run-time, without a need to perform any comparison with previously captured user images or videos. By allowing a quick discrimination between captured images of a live person and captured images of a spoof alternative representation, additional processing can be preemptively terminated, thereby creating an additional layer of security.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Implementations of the present disclosure are directed to a platform for spoof detection. More particularly, implementations of the present disclosure are directed to illuminating a subject with highly auto-correlated temporal color-coded sequences, capturing temporally synchronized images of the subject, generating, by a matched filtering process using the selected color-coded sequence, a filtered response image from the sequence of images of the subject, determining, based on shape and texture information around an eye region of the filtered response image, that the subject is a live person, and in response to determining that the subject is a live person, initiating an authentication process to authenticate the subject.

To provide further context for implementations of the present disclosure, and as introduced above, biometric authentication systems can authenticate a user to a secure system based on recognizing the user's face. Such biometric authentication systems can capture one or more images of a user, and can execute corresponding recognition processes on the captured image. Malicious attempts to breach the security of such a biometric authentication system can include presenting an alternative representation of a live person, such as a mask with eye cutouts. Such masks with eye cutouts can be used in an attempt to breach the security of authentication systems that rely on eye-based cues such as corneal reflection or eye movement cues to determine whether the subject is a live person or not. Such masks can also be used, for example, to breach vulnerable single frame liveness detection methods that do not take into account of such spoof attacks. The alternative representation of the live person can be used to gain access to an account or other privileges associated with the identity of the corresponding live person. Actions including impersonation of a live person to gain access to secured data are generally known as spoof attacks. The reliability and security of a biometric authentication system can depend on the ability of the system to differentiate between a live person and corresponding alternative representations (also referred to as spoofs). In view of the above context, implementations of the present disclosure improve security and reliability of biometric authentication systems that rely on recognizing features indicating masks with eye cutouts. Specifically, implementations of the present disclosure provide a technical solution that enables differentiation between an actual live person and a spoof alternative representation, such as a malicious actor wearing a two-dimensional mask or a three-dimensional mask with eye cutouts that represents the face of another person.

Figure 1:
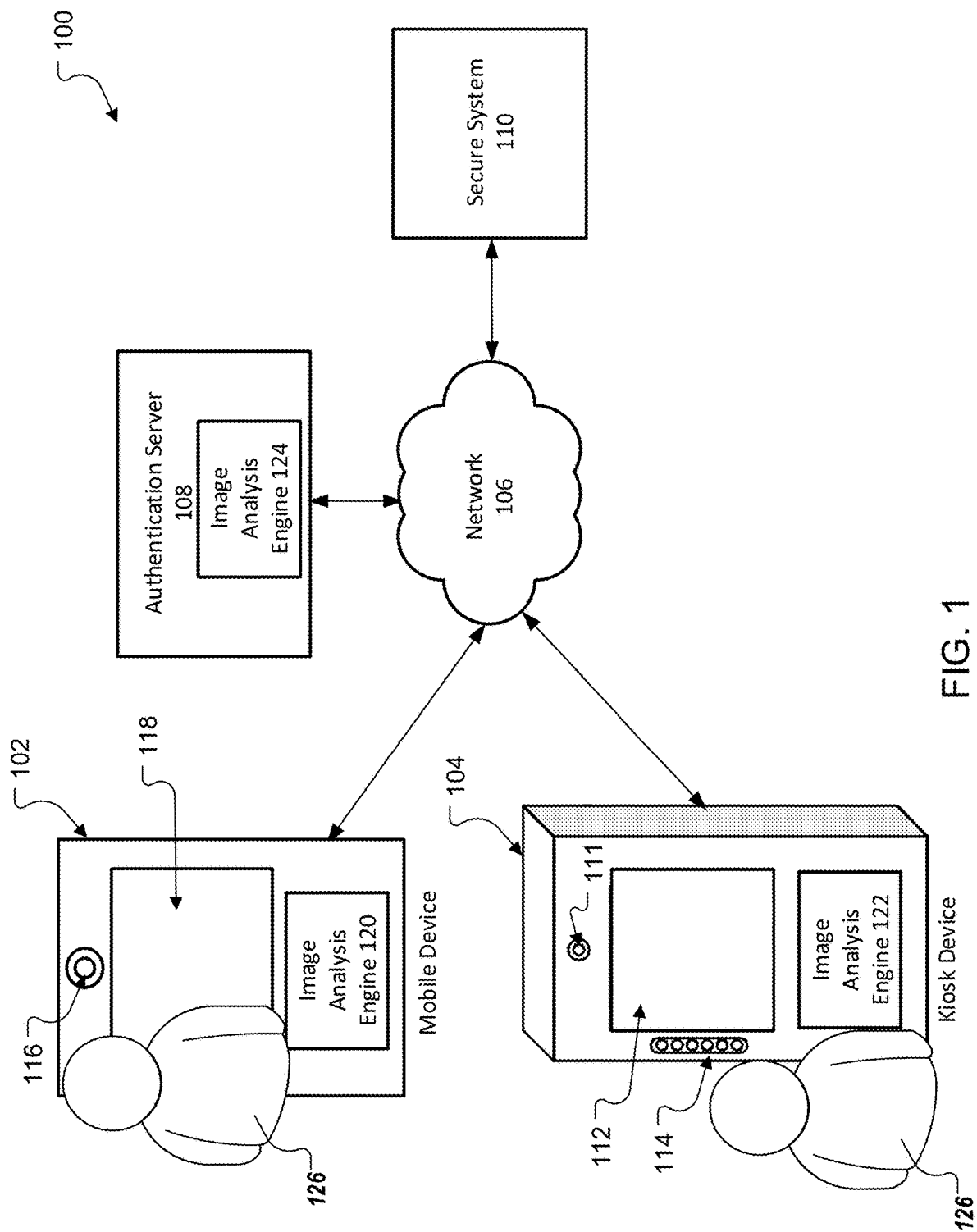
FIG. 1 depicts an example architecture in which the implementations of the present disclosure may be used.

FIG. 1 depicts an example architecture 100 in accordance with implementations of the present disclosure. In the depicted example, the example architecture 100 includes user devices 102, 104, a network 106, an authentication server 108, and a secure system 110. In the depicted example, a user 126 interacts with the user devices 102, 104.

In some implementations, the user devices 102, 104 can communicate with the authentication server 108 and the secure system 110 over the network 106. The network 106 includes one or more of the following: a local area network (LAN), wide area network (WAN), the Internet, a virtual private network (VPN), etc., or a combination thereof. The network 106 connects user devices (e.g., the user device 104, or the user device 102, etc.), the authentication server 108, and the secure system 110. In some implementations, the network 106 can be accessed over a wired and/or a wireless communications link.

In some implementations, the user devices 102, 104 include any appropriate type of computing devices such as a desktop computer, a laptop computer, a handheld computer, a tablet computer, a personal digital assistant (PDA), a cellular telephone, a wearable device (e.g., smart watch or smart glasses), a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the user device 102 can be a mobile device. The user device 102 can be used for various purposes that require authenticating users 126 via one or more biometric authentication processes. For example, the user device 102 can be used to authenticate a user for one or more services (e.g., a payment processing service) that are available to the user 126 via an application executing on the user device 102. The application executing on the user device 102 can require the user to be authenticated via a biometric authentication process before allowing access to a secure system 110 associated with requested services. In some implementations, a biometric authentication process that is based on eye cutout detection and may require capture of a facial image of the user 126.

The user device 102 (e.g., mobile device) can include a camera 116 that can be employed to capture images of the user 126 of the user device 102. The user device 102 can include a display screen 118 (e.g., a touch screen) that allows a user to interact with the user device 102, e.g., performing a payment process on the mobile device. The user device 102 can use an active illumination method to perform the liveness detection. The user device 102 can illuminate the user 126 in accordance with a color-coded sequence that exhibits high-autocorrelation properties. The user device 102 can illuminate the user 126 using the display screen 118. For example, the user device 102 can show the sequence of colors on the display screen 118. The mobile device can use the camera 116 to capture a sequence of images of the illuminated face of the user 126. The sequence of images is temporally synchronized with the illumination by the color-coded sequence.

In some implementations, the user device 104 (e.g., kiosk device) can be used for various processes that require authenticating users 126 via one or more biometric authentication processes. For example, the user device 104 can include an ATM that allows a user 126 to withdraw money from a bank account. In another example, the user device 104 can be deployed at a service or asset providing location (e.g., restaurant or a fast-food outlet), and can allow a user 126 to order and purchase a service or an asset (e.g., merchandise or food). The user device 104 can also be deployed at an entry point of an event center or a service center (e.g., at the gate of an arena, a convention center, a stadium, a transportation station or airport) or at various types of locations to authenticate users interactively, or even without any active participation of the user.

In some implementations, the user device 104 can include one or more components and features that support a biometric authentication system. The user device 104 can include a camera 111. The camera 111 can be employed to capture images of, for example, users 126 interacting with the user device 104 or being in the proximity the user device 104. The user device 104 can include a display panel 112 (e.g., a capacitive touch screen) that allows a user to interact with the user device 104, e.g., selecting and ordering food at a retail outlet. Once the user completes the interaction via user-interfaces presented on the display panel 112, the user may be provided with instructions to perform one or more operations (e.g., look towards the camera 111) for biometric authentication. The biometric authentication process performed using example architecture 100 shown in FIG. 1 can include a liveness detection process. Multiple images captured using the camera 111 can be analyzed to determine whether the images captured using the camera 111 correspond to an actual live person or if the images correspond to an alternative representation of the live person. For example, an alternative representation of a live person can be a user 126 wearing a mask with eye cutouts, the mask representing the live person, or a video or image of the live person, and so on. The user device 104 can be configured to perform an active illumination method during the biometric authentication process. The user device 104 illuminates the user in accordance with a sequence of colors in a selected color-coded sequence. The color-coded sequence is selected from a set of color-coded sequences that have strong auto-correlation properties individually.

The user device 104 can illuminate the user using the display panel 112 or an illumination source 114 that can be separate from the display panel 112. In some implementations, the user device 104 can show the sequence of colors on the display panel 112 and use the display panel 112 to illuminate the user. In some implementations, the user device 104 can include an illumination source 114 that is separate from the display panel 112. Although one illumination source 114 is shown in FIG. 1, the device 104 may include multiple illumination sources. Although some implementations of the present disclosure are described as using one illumination source, multiple illumination sources can be used. The illumination source 114 can include one or more light emitting diode (LED) elements that may be controlled to generate electromagnetic radiation sequences according to the selected color-coded sequence. For example, the illumination source 114 can illuminate the face of a user 126 in a specified light color pattern. The user device 104 can use the camera 111 to capture a sequence of images of the illuminated user 126. The sequence of images is temporally synchronized with the illumination by the color-coded sequence. For example, the camera 111 can capture the first image at a time point during a time interval when the display panel 112 displays a first color. The camera 111 can capture the second image, third image, fourth image, and fifth image during corresponding time intervals that are synchronized with the display of the colors in the color-coded sequence.

The sequence of images captured by the user device can be analyzed using an image analysis engine (e.g., image analysis engine 120, 122, or 124). The image analysis engine can generate a filtered response image by a matched filtering process using the selected color-coded sequence. Based on the filtered response image, the image analysis engine 120, 122, or 124 can determine whether the user 126 is an alternative representation of a live person (e.g., a user 126 wearing a mask impersonating a different person). More details about the matched filtering process are described in further detail below with reference to FIGS. 4A-4B.

In some implementations, the image analysis engine can be located at a remote location with respect to the user device 102 or 104. For example, the image analysis engine 124 can be implemented on a server that is remotely located with respect to a user device 102 or user device 104 on which the sequence of images is captured. As shown in FIG. 1, for example, the image analysis engine 124 can be implemented on the authentication server 108. In such cases, the user devices 102 or 104 can communicate with the image analysis engine 124 over one or more networks 106.

In some implementations, at least a portion of the image analysis engine can be located on the same user device 102, 104 that captured the sequence of images. For example, the user devices 102, 104 can include an image analysis engine 122 that can perform a matched filtering process using the selected color-coded sequence and can generate a filtered response image. The user devices 102, 104 can send the filtered response image over the network 106 to the authentication server, instead of sending the sequence of images, reducing the traffic on the network 106. After receiving the filtered response image, the image analysis engine 124 on the authentication server 108 can process the filtered response image using a machine-learning algorithm trained to discriminate between filtered response images of live people and filtered response images of alternative representations of the live people.

As another example, the user device 102 can include an image analysis engine 122 that can discriminate filtered response images of alternative representations of the live people based on the previously trained machine-learning algorithm. The user devices 102, 104 can perform the entire liveness detection process within the user device 102, 104, including generating the filtered response image and determining whether the user 126 is an alternative representation of a live person using a trained machine-learning algorithm.

In some implementations, the authentication server 108 includes at least one server and at least one data store. In the example of FIG. 1, the authentication server 108 is intended to represent various forms of servers including, but not limited to a web server, an application server, a proxy server, a network server, and/or a server pool. In general, server systems accept requests for application services and provide such services to any number of client devices (e.g., the user device 102 over the network 106).

In accordance with implementations of the present disclosure, and as noted above, the authentication server 108 controls whether user devices 102, 104 can have access to the secure system 110. For example, the image analysis engine 120, 122, 124 can determine that the captured images of the user 126 in the sequence of images correspond to an alternative representation of a live person. Alternative representations of a live person can be an indicator of a malicious attempt of unauthorized access to the secure system 110, in which the perpetrator of the attempt points the user device 102, 104 towards a high quality photograph of an authorized user that is printed on paper, or a recorded video of the authorized user displayed on a high-resolution display panel. In response to determining that the user 126 is an alternative representation of a live person, the image analysis engine 120, 122, 124 can preemptively prevent any of the images to be further processed by the authentication server 108, thereby preventing access to the secure system 110. If the image analysis engine 120, 122, 124 determines that the images of the user 126 correspond to a live person, an authentication process based on one or more images of the user 126 can be initiated (e.g., at the authentication server 108) to determine if the live person is authorized to access the secure system. For example, after determining the liveness detection result, the user device 102 or the user device 104 can send the liveness detection result to the authentication server 108 over a network 106. Based on the liveness detection result, the authentication server 108 can allow or prevent access to the secure system 110.

A corresponding sequence of images is synchronously captured using an image capture device such as a camera of the user device. A matched filtering process is applied to the captured sequence of illuminated images to generate a filtered response image. The filtered response image can show information of the illuminated user 126, such as shape information, depth information, and texture information, which can indicate the presence of potential eye cutouts. By performing image analysis on the filtered response image, a determination can be made whether the illuminated user 126 is a live person or an alternative representation (e.g., a photo, a digital image, a video replay, etc.) of a person wearing a mask with eye cutouts. If the user 126 is determined to be a live person, an authentication process can be continued. If the user 126 is determined to be an alternative representation, any access attempt to an underlying secure system 110 can be prevented, for example, by aborting any authentication process. Based on detecting that the captured image sequence is a spoof, any further processing of the image to allow access to a corresponding secure system 110 can be prevented, thereby adding an additional layer of security to the secure system 110 in addition to the existing authorization and/or authentication techniques, e.g., password verification, or facial recognition. The authentication process is described in further detail below with reference to FIG. 5.

Figure 2:
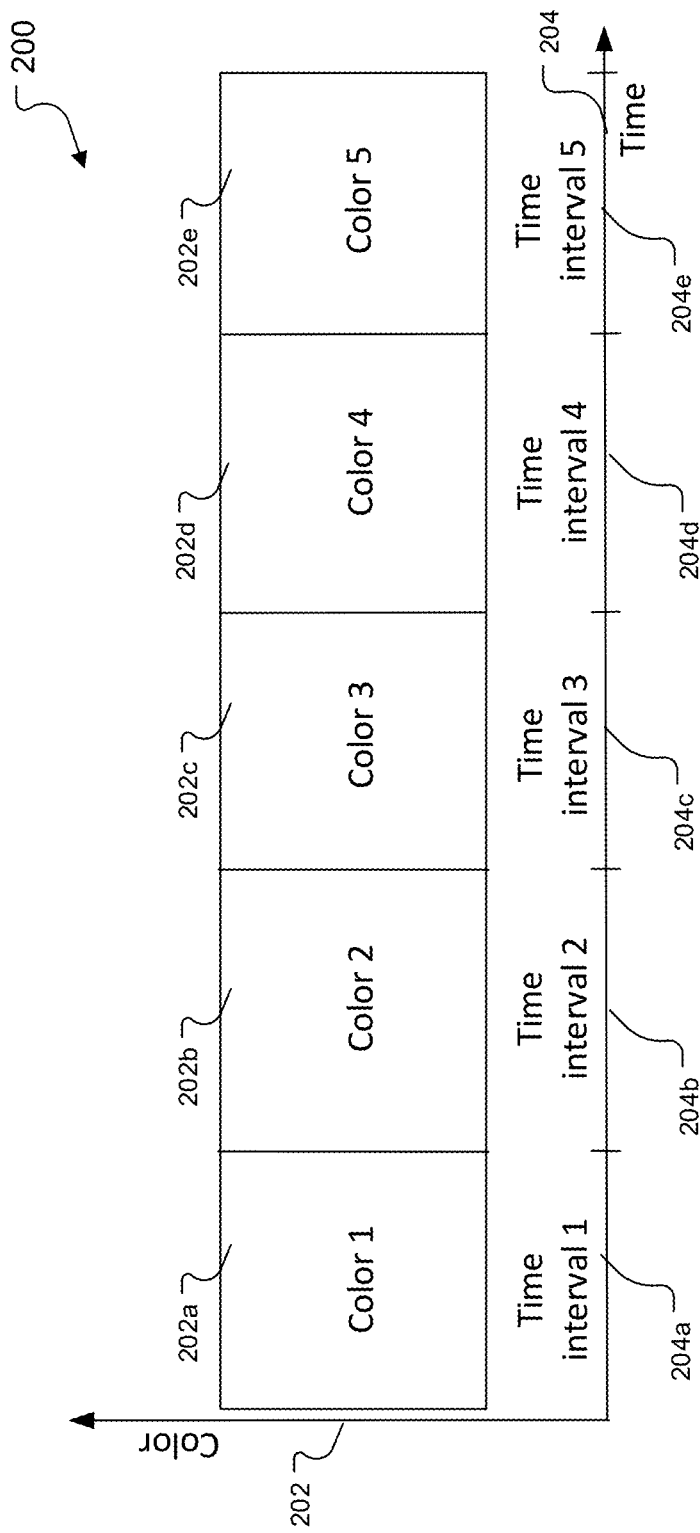
FIG. 2 depicts an example of a color-coded sequence.

FIG. 2 shows an example of a color-coded sequence 200. The color-coded sequence 200 defines a sequence of colors 202 relative to time 204. The color-coded sequence 200 includes multiple colors 202a, 202b, 202c, 202d, 202e that are displayed during successive time intervals 204a, 204b, 204c, 204d, 204e. In some implementations, the total number of colors in the color-coded sequence 200 can include 3 to 7 different colors out of 7 or more candidate colors. In some implementations, a color 202 can be displayed twice at different time intervals. The time intervals 204a, 204b, 204c, 204d, 204e can be equal in length or can have different durations. In some implementations, the time intervals 204a, 204b, 204c, 204d, 204e can be milliseconds to seconds long.

A user device (e.g., user devices 102, 104 described with reference to FIG. 1) can illuminate a face of a user according to a sequence of colors 200 at the predetermined time intervals 204a, 204b, 204c, 204d, 204e. For example, the user device can use a display panel to display the sequence of colors 200 as a series of quick flashes that are synchronized with a camera integrated in or coupled with the user device such that the camera captures at least one image of the user's face illuminated by each color 202a, 202b, 202c, 202d, 202e in the sequence of colors 200. In some implementations, the captured sequence of images can be correlated with the illumination sequence to determine whether the captured sequence is legitimate, or coming from an attack source.

The filtered response generated with a matching sequence can be used to detect depth discontinuities and differences in albedo between inner eye hole tissues (e.g., from a live user) and outer eye material (e.g., from a spoof representation such as a mask or photo). Albedo properties can indicate an amount of incoming radiation, which is reflected by a reflective surface (e.g., skin of the subject or outer layer of the mask). Such eye cutout detection can improve security of a secure system protected by a biometric authentication process, even when the attacker uses sophisticated video replay attack schemes with added color illumination effects or masks with eye cutouts.

Figure 3A:
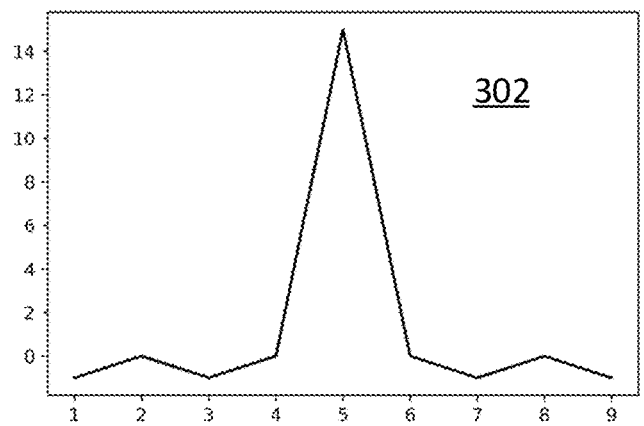
FIG. 3A depicts the autocorrelation function of the color-coded sequence in FIG. 2.

FIG. 3A shows an example of an autocorrelation function 302 as applied to a color-coded sequence, such as color-coded sequence 200 described with reference to FIG. 2. The autocorrelation function 302 shows that the color-coded sequence with multiple (e.g., 5) different colors presents a strong auto-correlation property, with a pronounced peak value, and differentiable low value at its side lobes.

In some implementations, a merit factor can be used to measure the auto-correlation property of a color-coded sequence. In general, a merit factor is used for one-dimensional signals. The concept of the merit factor is extended to an N-dimensional color-coded sequence, e.g., a three-dimensional RGB coded-coded sequence, in order to evaluate the auto-correlation property of the sequence.

For example, the merit factor can be defined as the following:

$$\sum_{d=1}^{3} \frac{|C_{f,f}(0, d)|^2}{\sum_{s!=0}^{2N-1} |C_{f,f}(s, d)|^2}, \quad (1)$$

where d is the number of dimensions (e.g., 3 for RGB colors), $C_{f,f}$ is the one-dimensional discrete auto-correlation function of the signal f to itself, s is the correlation index with the index 0 corresponding to the peak of the auto-correlation function, and N is the length of the sequence (e.g., length can be 5 or 7).

The merit factor for each candidate sequence can be calculated and ranked. A subset of sequences can then be selected based on the corresponding merit factors satisfying a threshold condition. In some implementations, a subset of candidate sequences corresponding to the highest merit factor among all candidate sequences can be selected as the preferred sequences having strong auto-correlation properties. For example, for color-coded sequences with five colors, a subset of 1152 sequences can be extracted from the total of $2^{15}$ candidate sequences. The selected subset of 1152 sequences all have a highest merit factor value of 56.25 among all the candidate sequences.

Figure 3B:
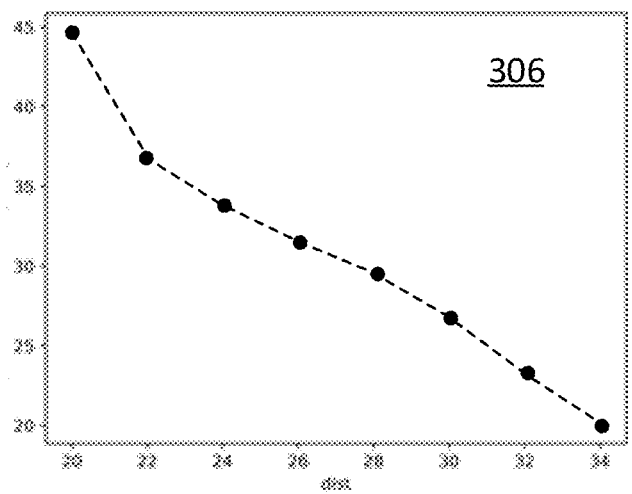
FIG. 3B depicts an example of signal magnitude as function of depth.

FIG. 3B shows an example of magnitude of signal to distance relationship 306. The example of magnitude of signal to distance relationship 306 indicates an inversely proportional relationship between the magnitude of signal and a square of the distance between a camera and illuminated subject's face. In some implementations, inter-ocular distance (iod) that can be extracted from the captured images (e.g., distance between automatically detected irises) is considered as being inversely proportional with the distance between a camera and illuminated subject's face.

Figure 3C:
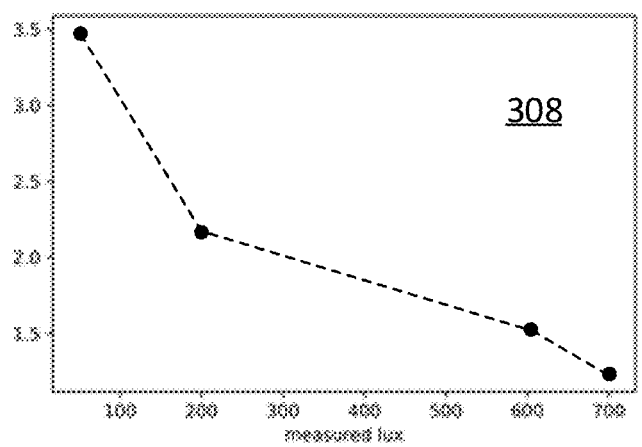
FIG. 3C depicts an example of signal magnitude as function of ambient luminosity.

FIG. 3C shows an example of magnitude of signal to ambient luminosity relationship 308. The example of magnitude of signal to ambient luminosity relationship 308 indicates a quasilinear inversely proportional relationship between the magnitude of signal and an ambient luminosity that might interfere with color-coded illumination of the subject's face during an authentication process.

The magnitude of signals within captured images of a subject can be predicted for a live user as a function of several factors, including ambient illumination (competing light), and camera-to-subject pose (primarily distance and dominant angle of reflection of the face). Other factors, including subject skin tone, and offset from the central axis of screen illumination, where light is most concentrated, can also play a role, and can be included in the magnitude of signal prediction model. In some implementations, the predicted signal (from the model) and the measured signal (from the filter) can be compared (e.g., using correlation functions or by applying a spatial derivative function) as a part of the liveness classification logic. If a strong signal is predicted, a filter response classification can behave reliably, and a liveness verdict can be reported. If a weak signal is predicted, classification can behave unreliably, and no liveness verdict can be reported. The discrepancies between predicted and measured signals can be used in some cases to obviate the need for more complex processing intensive classification methods. For example, a strong predicted signal paired with a weak measured signal can be treated as a reliable indicator of monitor-based spoof attacks, due to the non-diffuse directional reflectance of monitor screen materials coupled with the competing internal light source of the monitor. The predicted signal strength can reliably determine classification defining a signal reliability model. Such a signal reliability model can be useful in determining when this spoof detection method is reliable for differentiating between live and 2D/3D alternate representations of a live user with eye cutouts. In some implementations, the signal reliability model can provide real time feedback to the user regarding a perceived reliability of a particular determination.

Figure 4A:
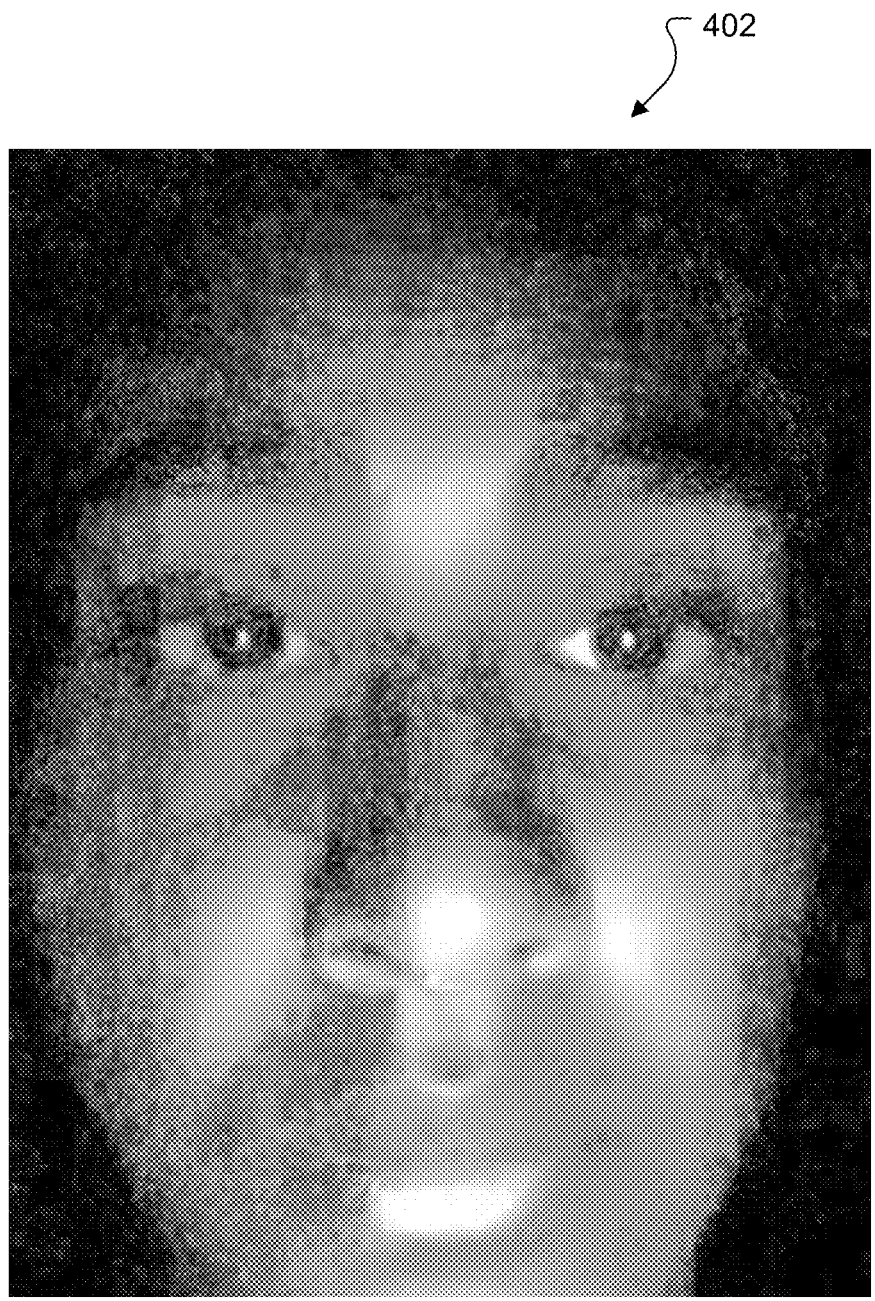
FIGS. 4A and 4B depict examples of filtered response images.
Figure 4B:
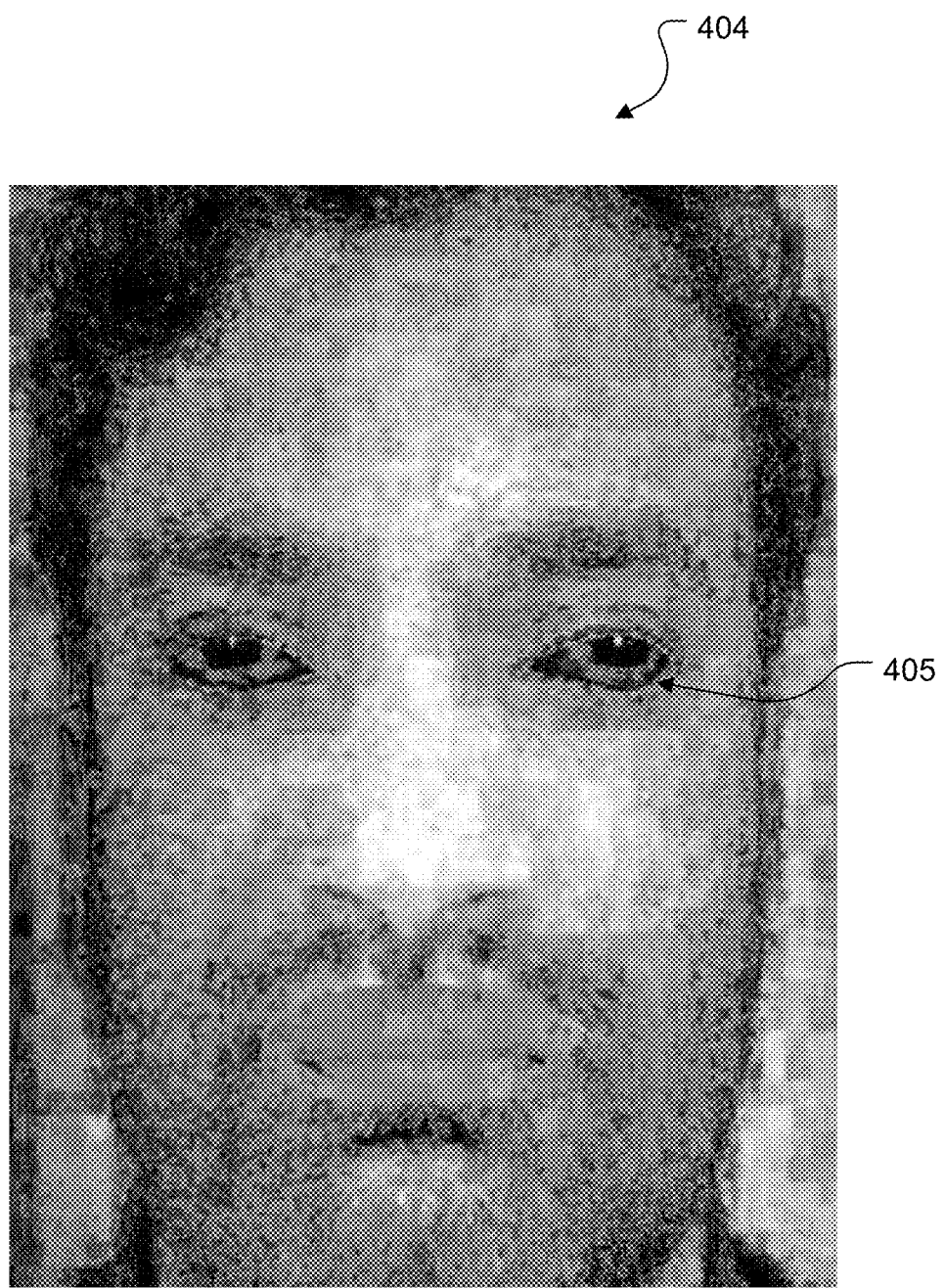

FIGS. 4A and 4B show examples of filtered response images 402, 404 generated during a liveness detection process for alternative representations of a live person. After obtaining the sequence of images of the subject, an image analysis engine can be configured to execute a matched filtering process on the sequence of images. The matched filtering process can generate a filtered response image 402, 404 from the sequence of images of the subject using a matched filter. The matched filter can be configured to perform color matching according to the randomly selected color-coded sequence. For example, a matched filter for a color-coded sequence "BYYWG" can be a filter with same sequence "BYYWG" such that the filter matches with the illumination sequence.

A filtered response image 402, 404 of an alternative representation of a live person can have different image features than that of a live person due to differences in optical properties of a masked person in comparison to the face of a live person. The captured image of the alternative representation of the live person can have different shape information due to changes in the depth and angle of reflection, e.g., a display screen (2D) versus a live human face (3D). The captured image of the spoof can have different texture information, due to reflective properties of the surface material (e.g., photo or mask with eye cutouts) versus human skin.

The filtered response image 402, 404 can enhance the image feature differences in the sequence of images. For example, variations in signal magnitude in the filtered response image can better reveal the shape information and the texture information of the illuminated subject. Live samples are characterized by a filtered response image with an appearance that reveals the underlying 3D face structure of a human face. The magnitude of each pixel in the filtered response image is inversely proportional to the angle of incidence of the active illumination. For example, the nose tip and the cheek bones of a live person can provide strong reflections, while the sides of the face of a live person can provide weaker reflection because the sides of the face angle away from the camera.

An alternative representation of the live person based on a 2D photo exhibits a flatter appearance in the filtered response image. Additionally, a 2D photo lacks discontinuity in the filtered response image along the contour of the face. As another example, alternative representation of the live person based on monitor based attacks display an image or a video of a live person. A monitor has reflective films and is a light source itself. Monitors can emit and reflect light like a mirror, such that the filtered response image observed in a monitor attack can be very weak overall and can have localized high intensity responses. As another example, a filtered response image 404 of an alternative representation of a live person wearing a mask with eye cutouts can show depth discontinuities 406 in an eye region that are significantly higher than the signal to noise ratio, providing a reliable identification of the alternative representation of the live person during liveness detection. If the active illumination configuration only employs a single fixed sequence, it can be predicted and replicated, leaving the method vulnerable to attack.

FIG. 4A shows a filtered response image generated for a spoofing video that has illumination effect using the same color-coded sequence as the sequence used by a user device. The user device illuminates the subject using the color-coded sequence "BYYWG" as described with reference to FIG. 2. In this case, the subject is a spoofing video of a live person. The spoofing video includes color illumination effects using the same color-coded sequence "BYYWG". The color illumination effects were added to the video by the attacker. Thus, the spoofing video includes the color illumination effects that match the color-coded sequence "BYYWG" used in the active illumination process. Because of this, the image appearance of the filtered response image in FIG. 4A shows the same kind of image appearance of a filtered response image of a live person, e.g., with high signal magnitude, and with depth discontinuities at the sides of the cheek. The liveness detection process hence can accept the subject as a live person.

FIG. 4B shows a filtered response image generated for a live person wearing a mask with eye cutouts. The user device illuminates the subject using a color-coded sequence. The differences in the signal magnitude within the eye cutouts region in the filtered response image in FIG. 4B indicate that the image features of the filtered response image do not represent of a live person. The liveness detection process hence determines that this subject is an alternative representation of a live person and rejects further access to the secure system.

Figure 4C:
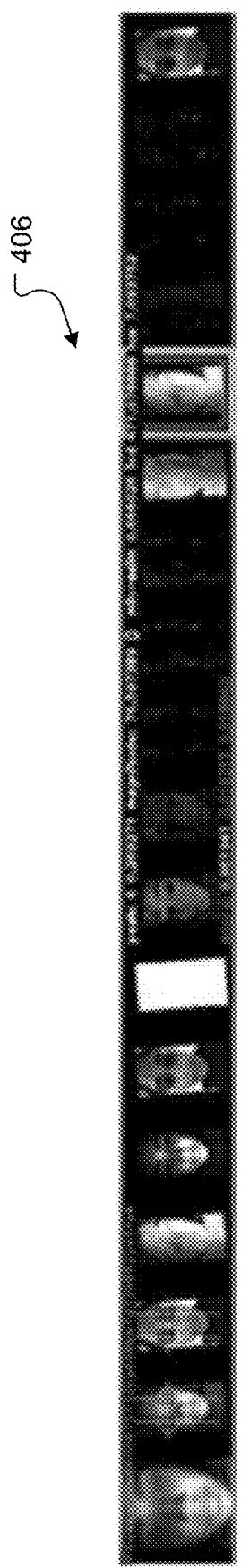
FIGS. 4C and 4D depict examples of sets of images generated in accordance with implementations of the present disclosure.
Figure 4D:
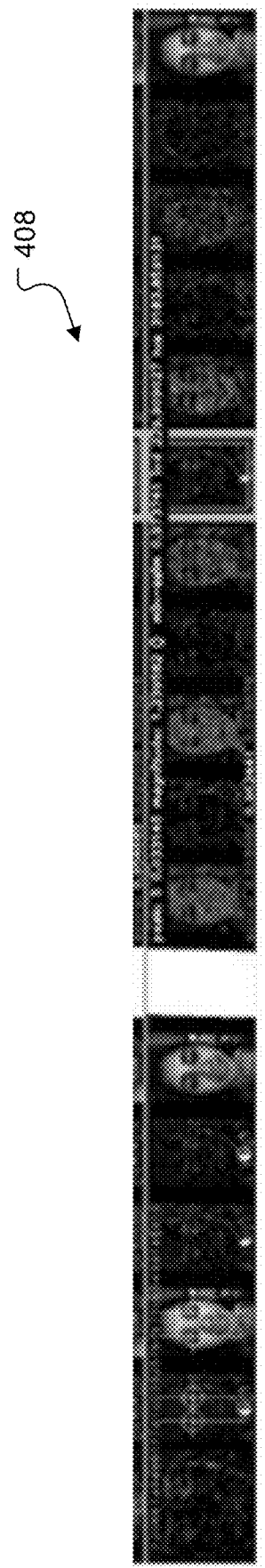

FIGS. 4C and 4D depict examples of sets of images 406, 408 that are derived based on captured images at different distances and different ambient luminosities. For example, FIG. 4C shows examples of images 406 with a cross correlation peak of 6, with average signal magnitude of 76, inter-ocular distance (iod) of 471 and ambient luminosity (lux) of 7. The measurements of the examples of images 406 indicate that the signal to noise ratio is sufficiently high to enable reliable results of the liveness detection process. As another example, FIG. 4D shows examples of images 408 with a cross correlation peak 5, with average signal magnitude of 1, inter-ocular distance (iod) of 229 and ambient luminosity (lux) of 3183. The measurements of the examples of images 408 indicate that the signal to noise ratio is below a predetermined threshold and the liveness detection process is limited in producing reliable results.

Figure 5:
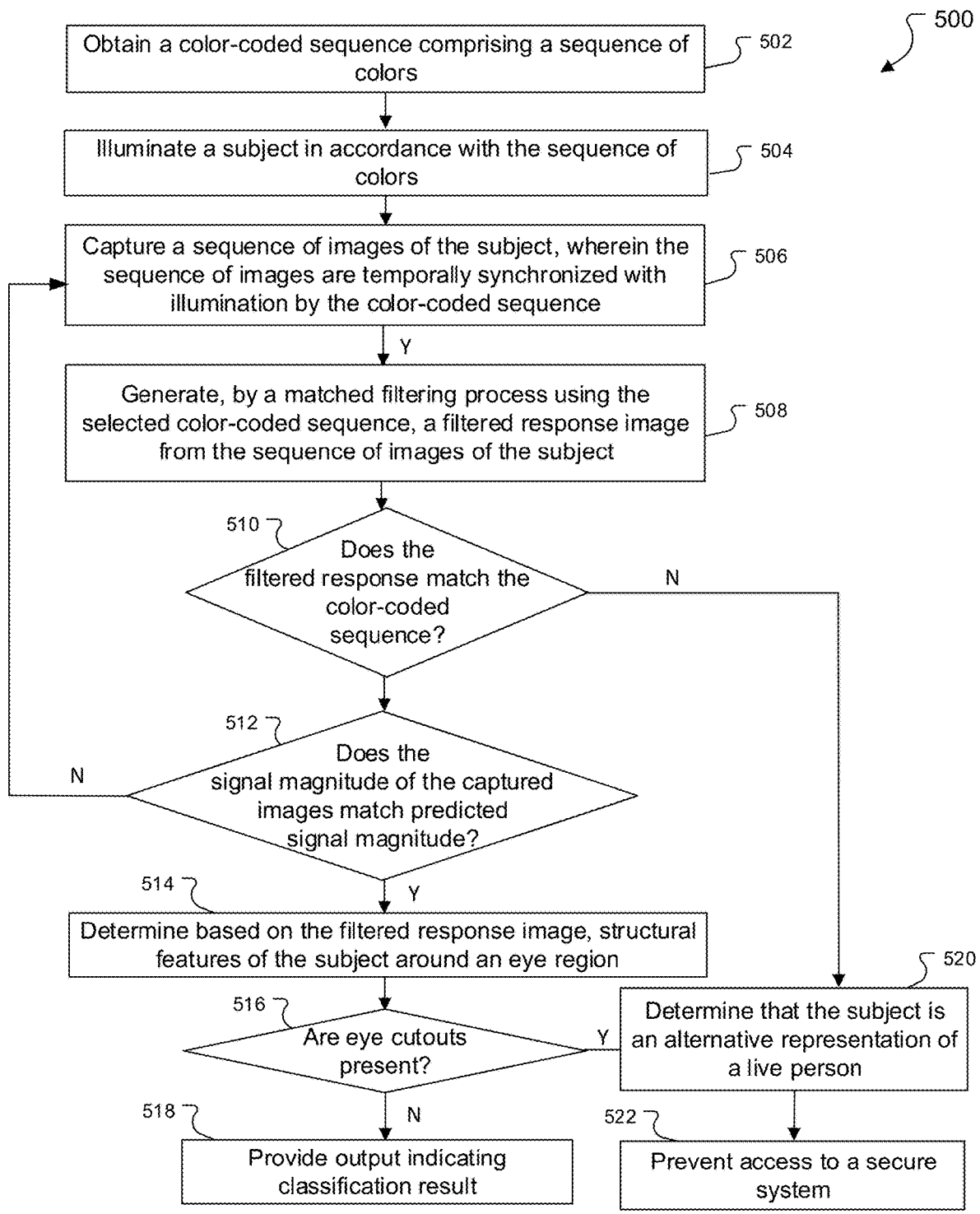
FIG. 5 is a flowchart of an example process that can be executed in accordance with implementations of the present disclosure.

FIG. 5 depicts an example process 500 for liveness detection. In some implementations, at least a portion of the process 500 can be executed by one of more components of the example architecture 100 described with reference to FIG. 1. In some implementations, at least a portion of the process 500 may be executed by the image analysis engine (e.g., 120 or 122 or 124) depicted in FIG. 1. In some implementations, at least a portion of the process 500 may be executed by one or more servers (e.g., authentication server 108 or computing devices in a distributed computing system) in communication with remote components such as one or more processing devices disposed within a user device (e.g., the user device 102 or the user device 104).

A color-coded sequence is obtained from a particular set of multiple color-coded sequences (502). Each color-coded sequence of the particular set of multiple color-coded sequences includes a sequence of colors to be displayed according to a sequence of time intervals. Each color-coded sequence can be characterized by auto-correlation properties exceeding a predetermined merit factor threshold (e.g., a preset percentage of highest merit factors).

A subject (e.g., a face of a subject) is illuminated in accordance with the sequence of colors in the selected color-coded sequence (504). In some implementations, a user device can illuminate the subject by showing the colors on a display screen of the user device. In some implementations, a user device can display the colors on the display screen except on the region where the face portion of the subject is displayed. For example, a mobile device can display an image of the subject in a user-friendly preview experience. The mobile device can identify a region of the face, display the face region on the display screen, and can use the rest of the region on the display screen to display the colors. In some implementations, the user device can direct the user to adjust a distance and a position relative to the camera to optimize visualization of the face of the user (e.g., to maximize single to noise ratio and to bring entire face of the user in a capturing field of the camera of the user device).

A sequence of images of the face of the subject is captured (506), wherein the sequence of captured images is temporally synchronized with illumination by the color-coded sequence. For example, each of the captured images can be captured during a middle of a display time interval of each color in the selected color-coded sequence. In some implementations, the user device can capture the sequence of images using camera sensors of the user device. For example, a camera sensor can include three-dimensional sensors, e.g., RGB sensors. The camera sensor can capture a first signal using the RED sensor, a second signal using the GREEN sensor, and a third signal using the BLUE sensor. In some implementations, the user device can capture one or more padding images in addition to the illuminated images. If a color-coded sequence includes timed display of five colors, the user device can capture five images before illumination, five images during illumination, and five images after illumination, i.e., a total of 15 images. The padding images can be useful when generating the spatially aligned images, e.g., using a facial landmark based alignment stabilization method. In some implementations, there is too much motion in the sequence of images that cannot be aligned or corrected, the image analysis engine can refrain from further processing of the sequence of the images, and may request a recapture of the images.

For the purpose of anti-spoofing, the operations of the steps 504 or 506 can include one or more additional features to increase the security of the system, while decreasing the predictability of the process 500. For example, the user device can select a different starting point of the color sequence in different instances and capture the sequence of illuminated face image corresponding to the sequence of colors displayed on the screen. For example, for a five-color sequence, the starting point of the sequence can be either at the first color of the sequence, or at a subsequent color of the sequence. In some implementations, the user device can illuminate the color-coded sequence at a fixed frequency (e.g., colors displayed for equal time intervals) or at a variable frequency (e.g., colors displayed for time intervals with different durations). For example, the user device can illuminate the first color for 1 second, the second color for 0.5 seconds each, the third color for 0.1 seconds, the fourth color for 0.3 seconds, and the fifth color for 0.4 seconds. When capturing the sequence of images, the user device can be temporally synchronized with the illumination frequency. If the active illumination process uses variable illumination frequency, the capturing process can use a synchronized variable frequency.

A matched filtering process is executed using the selected color-coded sequence to generate a filtered response image from the sequence of images of the subject (508). In some implementations, the image analysis engine can calculate a sequence of filtered response images by applying a matched filter to the sequence of spatially aligned images, wherein the matched filter corresponds to the selected color-coded sequence. In some implementations, the image analysis engine can pre-process the sequence of images before generating the filtered response image. In some implementations, subject movements during capturing the sequence of images can be detected to spatially align the captured images (e.g., the location and shape of the faces are spatially aligned among the captured images), and to avoid a request to recapture the images.

It is determined whether the sequence of filtered response images matches the selected color-coded sequence used for illumination (510). If it is determined that the sequence of filtered response images fails to match what is expected for the selected color-coded sequence used for illumination, determined determination may be made that the subject is an alternative representation of a live person (520). If it is determined that the sequence of filtered response images matches what is expected for the selected color-coded sequence used for illumination one or more filtered response images are selected from the sequence of filtered response images for further processing. In some implementations, the image analysis engine can select the one or more filtered response images that have the maximum average signal magnitude.

It is determined whether the signal magnitude of the one or more filtered response images matches a predicted signal magnitude (512). The magnitude of signals within the filtered response images of a subject can be predicted for a live user as a function of several factors, including ambient illumination (competing light), and camera-to-subject pose (primarily distance and dominant angle of reflection of the face). In some implementations, the image analysis engine can determine that the ambient light in one or more captured images exceed a predetermined luminosity threshold. The liveness detection process relies on the depth information of the face of a live person, especially in the eye region, which is derived from the diffused reflections using the active illumination from the illumination device. If one or more captured images are too bright, the liveness detection process may not generate a reliable result because the ambient light dominates the active illumination. The image analysis engine can refrain from further processing of the sequence of the images, and may request a recapture of the images (506). Other factors, including subject skin tone, and offset from the central axis of screen illumination, where light is most concentrated, can also play a role, and can be included in the magnitude of signal prediction model. In some implementations, the predicted signal (from the model) and the measured signal (from the filter) can be compared (e.g., using correlation functions or by applying a spatial derivative function) as a part of the liveness classification logic. If a strong signal is predicted, a filter response classification can behave reliably, and a liveness verdict can be reported. If a weak signal is predicted, classification can behave unreliably, and no liveness verdict can be reported and a request a recapture of the images can be generated (506). The discrepancies between predicted and measured signals can be used in some cases to obviate the need for more complex processing intensive classification methods. For example, a strong predicted signal paired with a weak measured signal can be treated as a reliable indicator of monitor-based spoof attacks, due to the non-diffuse directional reflectance of monitor screen materials coupled with the competing internal light source of the monitor.

If it is determined that the signal magnitude of the one or more filtered response images matches a predicted signal magnitude, structural features are extracted from the one or more filtered response images (514). The structural features can include reference points (e.g., eyes and/or irises), intraocular distance (based on distance between irises), and estimated depths. The inter-ocular distance can be extracted from the filtered response images and is used to determine a distance between a camera and illuminated subject's face. It is determined, based on the structural features whether eye cutouts are present in the region of the eyes of one or more filtered response images (516). In some implementations discontinuities (e.g., abrupt change in pixel values) around the eye region can be automatically extracted (e.g., based on the reference points) to identify potential presence of eye cutouts. A filter (e.g., a median filter) can be applied to the portion of the filtered response image including the eye region to detect potential depth (distance) transitions and separate them from false positive detections of depth (distance) transitions. In some implementations, the filtered response image corresponding to a subject can be compared (e.g., by subtraction) to a filtered response image of a live person. The differences between the filtered response image of the live person and the filtered response image of the subject can be classified as morphological and structural features that can be correlated to facial anatomical features, and albedo variations (e.g., person skin and/or texture of a mask). In some implementations, determining whether the structural features indicate that subject is the alternative representation of the live person can include processing the filtered response image using a machine learning process trained to discriminate between filtered response images of live people and filtered response images of alternative representations of the live people. For example, the machine learning process can include processing the filtered response image using a trained image classification algorithm. The image classification algorithm can be trained using sample filtered response images of live people and sample filtered response images of spoof attacks. The trained image classification algorithm can differentiate subtle shape, depth, and texture features in a filtered response image. The trained image classification algorithm can output a probability that an input filtered response image includes or not eye cutouts and whether or not it is generated from an active illumination of a live person. In some implementations, the image classification algorithm can include one or more convolutional neural network (CNN) models. If it is determined that eye cutouts are not present and it is highly probable that the captured images are generated from an active illumination of a live person, an output is provided indicating the classification result (e.g., live person detected) (518).

If it is determined that eye cutouts are present in the region of the eyes of one or more filtered response images, it is determined that the subject is an alternative representation of a live person (520). In some implementation, the alternative representation of the live person includes video replay of the live person on a display panel. In some implementations, the alternative representation of the live person can include a photograph of the live person printed on paper, or presented on a display panel. In some implementations, the alternative representation of the live person can include a masked representation of the live person with eye cutouts. If it is determined, based on the filtered response image, that the subject is an alternative representation of a live person, access to a secure system is prevented (522).

Operations of the process 500 also include preventing, responsive to determining that the subject is the alternative representation of the live person, access to a secure system (514). In some implementations, preventing access to the secure system can include preemptively preventing any of the images to be further processed by the authentication server 108, thereby preventing access to the secure system. In some implementations, preventing access to the secure system can terminating an application of the user device and/or disabling a functionality of the user device for interrupting a network communication with a secure system for a predetermined duration. Preventing access to the secure system can improve performance of an underlying biometric authentication system by filtering out spoof attacks at a front end, and thereby reducing waste of computational resources.

In some implementations, operations of the process 500 can further include: [ . . . ]

Figure 6:
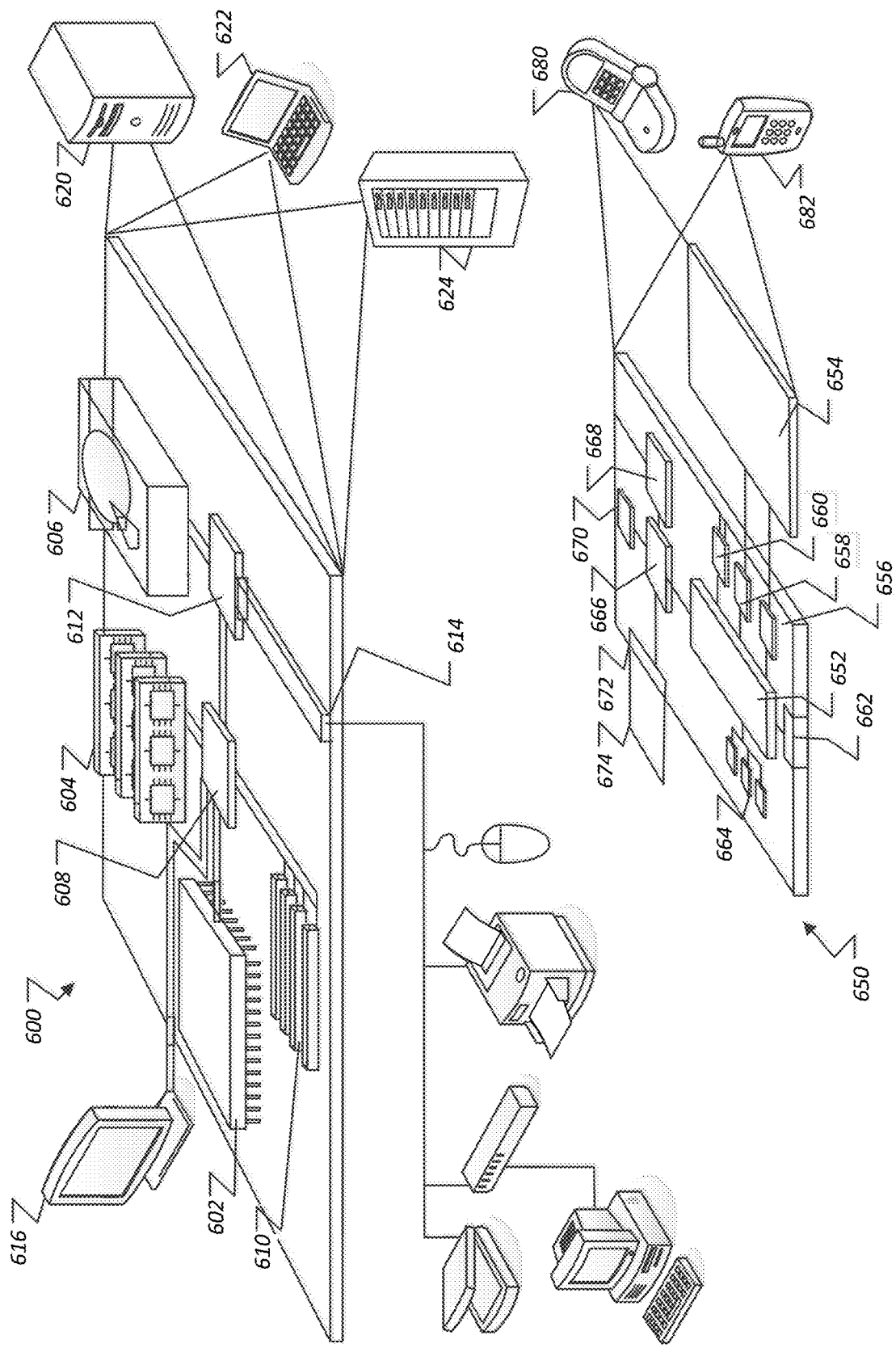
FIG. 6 is a schematic illustration of example computer systems that can be used to execute implementations of the present disclosure.

FIG. 6 shows an example of a computing device 600 and a mobile device 650, which may be used with the techniques described here. For example, referring to FIG. 1, the user device 104 can include one or more of the computing device 600, either in part or in its entirety. The user device 102 can include one or more of the mobile device 650, either in part or in its entirety. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high-speed controller 608 manages bandwidth-intensive operations for the computing device 600, while the low-speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. For example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. The sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

The computing device 650 is configured to perform operations comprising obtaining a color-coded sequence comprising a sequence of colors, illuminating a subject in accordance with the sequence of colors, capturing a sequence of images of the subject, wherein the sequence of images are temporally synchronized with illumination by the color-coded sequence, generating, by a matched filtering process on the sequence of images using the selected color-coded sequence, a filtered response image, determining, based on structural features around an eye region of the filtered response image, that the subject is a live person, and in response to determining that the subject is a live person, initiating an authentication process to authenticate the subject.

In some implementations, determining that the subject is the live person comprises: determining whether the eye region of the filtered response image comprises a portion of a mask with eye cutouts. The structural features of the subject around the eye region comprise one or more of depth discontinuities and albedo variations. Determining, based on the filtered response image, that the subject is a live person comprises processing the filtered response image using a machine learning process trained to discriminate between filtered response images of live persons and filtered response images of alternative representations of live persons. Generating the filtered response image comprises: generating, from the sequence of images, a sequence of spatially aligned images, calculating a sequence of filtered response images by applying a matched filter to the sequence of spatially aligned images, wherein the matched filter corresponds to the selected color-coded sequence, and selecting the filtered response image from the sequence of filtered response images. In some implementations the operations further comprise: determining, based on the filtered response image, a measured signal strength, determining a difference between a predicted signal strength and the measured signal strength, and determining, based on the structural features of the subject around the eye region that the subject is a live person. In some implementations the operations further comprise: determining, based on the structural features of the subject around the eye region, an absence of eye cutout features, and in response to determining the absence of the eye cutout features, determining that the subject is the live person.

Figure 7:
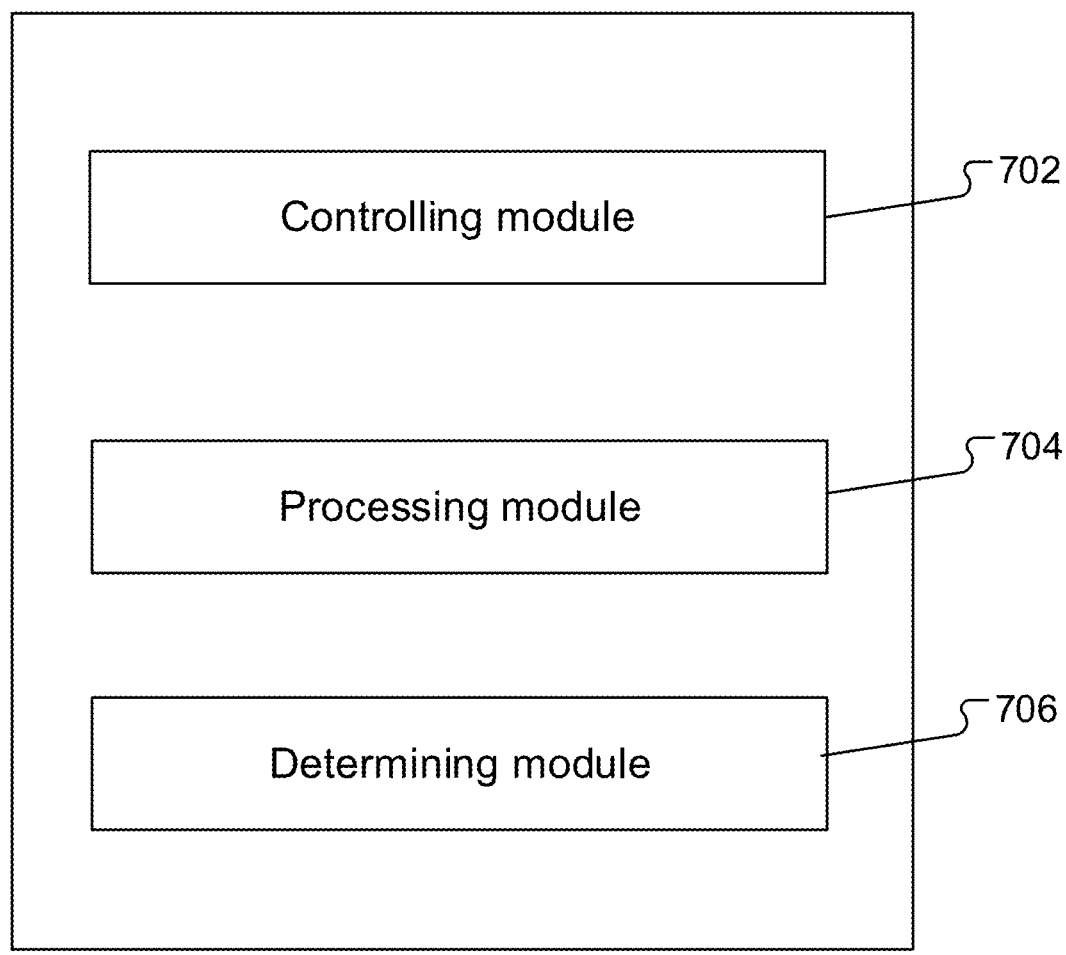
FIG. 7 depicts examples of modules of an apparatus in accordance with implementations of the present disclosure.

FIG. 7 depicts examples of modules of an apparatus 700 in accordance with one or more embodiments of the present disclosure. The apparatus can be an example of an embodiment of a system configured to perform biometric authentication using an illumination sequence. The apparatus 700 can correspond to the embodiments described above, and the apparatus 700 includes the following: a controlling module 702 that controls an image acquisition device to capture a sequence of images of a subject illuminated with a sequence of colors in a selected color-coded sequence, and the sequence of images are temporally synchronized with the illumination by the color-coded sequence; a processing module 704 that processes the sequence of images by a matched filtering process using the selected color-coded sequence and generates a filtered response image of the subject; and a determining module 706 that determines that the subject is an alternative representation of a live person based on the filtered response image. In response to determining that the subject is an alternative representation of a live person, the determining module 706 prevents access to a secure system.

In some embodiments, the alternative representation of the live person includes a photograph of the live person printed on paper, or presented on a display panel. In some embodiments, the alternative representation of the live person includes video replay of the live person on a display panel. In some embodiments, the determining module 706 determines that the subject is an alternative representation of a live person based on the filtered response image by: processing the filtered response image using a machine learning process trained to discriminate between filtered response images of live persons and filtered response images of alternative representations of the live persons.

In some embodiments, the processing module 704 generates the filtered response image from the sequence of images of the subject by a matched filtered process using the selected color-coded sequence by: generating, from the sequence of images, a sequence of spatially aligned images; calculating a sequence of filtered response images by applying a matched filter to the sequence of spatially aligned images, wherein the matched filter corresponds to the selected color-coded sequence; and selecting the filtered response image from the sequence of filtered response images.

In some embodiments, the first merit factor is defined as:

$$\sum_{d=1}^{M} \frac{|C_{f,f}(0, d)|^2}{\sum_{s!=0}^{2N-1} |C_{f,f}(s, d)|^2},$$

wherein M is a total number of colors in a color-coded sequence, N is length of the color-coded sequence, d is an index for the colors, $C_{f,f}$ is a one-dimensional discrete auto-correlation function of a color-coded sequence f, s is a correlation index in the function $C_{f,f}$.

In some embodiments, the controlling module 702 controls the image acquisition device to capture a second sequence of images of a second object illuminated by a second color-coded sequence. The second sequence of images are temporally synchronized with the illumination by the second color-coded sequence. The processing module 704 generates a second filtered response image from the second sequence of images of the second subject by a matched filtering process using the second selected color-coded sequence. The determining module 706 determines that the second subject is a live person based on the second filtered response image.

In some embodiments, the apparatus 700 includes an initiating module that initiates an authentication process for determining if the live person is authorized to access the secure system in response to determining that the second subject is a live person.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display panel (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 210 of FIG. 2. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
   obtaining a color-coded sequence comprising a sequence of colors;
   illuminating a subject in accordance with the sequence of colors;
   capturing a sequence of images of the subject, wherein the sequence of images are temporally synchronized with illumination by the color-coded sequence;
   generating, by a matched filtering process on the sequence of images using the color-coded sequence, a filtered response image;
   determining, based on structural features around an eye region of the filtered response image, that the subject is a live person;
   in response to determining that the subject is a live person, initiating an authentication process to authenticate the subject;
   determining, based on the filtered response image, a measured signal strength;
   determining a difference between a predicted signal strength and the measured signal strength; and
   determining, based on the structural features of the subject around the eye region that the subject is the live person.

2. The computer-implemented method of claim 1, wherein determining that the subject is the live person comprises:
   determining whether the eye region of the filtered response image comprises a portion of a mask with eye cutouts.

3. The computer-implemented method of claim 1, wherein the structural features of the subject around the eye region comprise one or more of depth discontinuities and albedo variations.

4. The computer-implemented method of claim 1, wherein determining, based on the filtered response image, that the subject is a live person comprises processing the filtered response image using a machine learning process trained to discriminate between filtered response images of live persons and filtered response images of alternative representations of live persons.

5. The computer-implemented method of claim 1, wherein generating the filtered response image comprises:
   generating, from the sequence of images, a sequence of spatially aligned images;
   calculating a sequence of filtered response images by applying a matched filter to the sequence of spatially aligned images, wherein the matched filter corresponds to the color-coded sequence; and
   selecting the filtered response image from the sequence of filtered response images.

6. The computer-implemented method of claim 1, further comprising:
   determining, based on the structural features of the subject around the eye region, an absence of eye cutout features; and
   in response to determining the absence of the eye cutout features, determining that the subject is the live person.

7. A non-transitory, computer-readable medium storing one or more instructions executable by a computer system to perform operations comprising:
   obtaining a color-coded sequence comprising a sequence of colors;
   illuminating a subject in accordance with the sequence of colors;
   capturing a sequence of images of the subject, wherein the sequence of images are temporally synchronized with illumination by the color-coded sequence;
   generating, by a matched filtering process on the sequence of images using the color-coded sequence, a filtered response image;
   determining, based on structural features around an eye region of the filtered response image, that the subject is a live person;
   in response to determining that the subject is a live person, initiating an authentication process to authenticate the subject;
   determining, based on the filtered response image, a measured signal strength;
   determining a difference between a predicted signal strength and the measured signal strength; and
   determining, based on the structural features of the subject around the eye region that the subject is the live person.

8. The non-transitory, computer-readable medium of claim 7, wherein determining that the subject is the live person comprises:
   determining whether the eye region of the filtered response image comprises a portion of a mask with eye cutouts.

9. The non-transitory, computer-readable medium of claim 7, wherein the structural features of the subject around the eye region comprise one or more of depth discontinuities and albedo variations.

10. The non-transitory, computer-readable medium of claim 7, wherein determining, based on the filtered response image, that the subject is a live person comprises processing the filtered response image using a machine learning process trained to discriminate between filtered response images of live persons and filtered response images of alternative representations of live persons.

11. The non-transitory, computer-readable medium of claim 7, wherein generating the filtered response image comprises:
   generating, from the sequence of images, a sequence of spatially aligned images;
   calculating a sequence of filtered response images by applying a matched filter to the sequence of spatially aligned images, wherein the matched filter corresponds to the color-coded sequence; and
   selecting the filtered response image from the sequence of filtered response images.

12. The non-transitory, computer-readable medium of claim 7, further comprising:
   determining, based on the structural features of the subject around the eye region, an absence of eye cutout features; and
   in response to determining the absence of the eye cutout features, determining that the subject is the live person.

13. A computer-implemented system, comprising:
   one or more computers; and one or more computer memory devices interoperably coupled with the one or more computers and having tangible, non-transitory, machine-readable media storing one or more instructions that, when executed by the one or more computers, perform operations comprising:
   obtaining a color-coded sequence comprising a sequence of colors,
   illuminating a subject in accordance with the sequence of colors, capturing a sequence of images of the subject, wherein the sequence of images are temporally synchronized with illumination by the color-coded sequence, generating, by a matched filtering process on the sequence of images using the color-coded sequence, a filtered response image, determining, based on structural features around an eye region of the filtered response image, that the subject is a live person, in response to determining that the subject is a live person, initiating an authentication process to authenticate the subject, determining, based on the filtered response image, a measured signal strength;

determining a difference between a predicted signal strength and the measured signal strength;

determining, based on the structural features of the subject around the eye region, an absence of eye cutout features; and determining, based on the structural features of the subject around the eye region or the absence of the eye cutout features that the subject is the live person.

14. The computer-implemented system of claim 13, wherein determining that the subject is the live person comprises:

determining whether the eye region of the filtered response image comprises a portion of a mask with eye cutouts.

15. The computer-implemented system of claim 13, wherein the structural features of the subject around the eye region comprise one or more of depth discontinuities and albedo variations.

16. The computer-implemented system of claim 13, wherein determining, based on the filtered response image, that the subject is a live person comprises processing the filtered response image using a machine learning process trained to discriminate between filtered response images of live persons and filtered response images of alternative representations of live persons.

17. The computer-implemented system of claim 13, wherein generating the filtered response image comprises:

generating, from the sequence of images, a sequence of spatially aligned images;

calculating a sequence of filtered response images by applying a matched filter to the sequence of spatially aligned images, wherein the matched filter corresponds to the color-coded sequence; and selecting the filtered response image from the sequence of filtered response images.

* * * * *